US010366069B1

(12) United States Patent
Pearson et al.

(10) Patent No.: US 10,366,069 B1
(45) Date of Patent: Jul. 30, 2019

(54) SYSTEMS AND METHODS FOR DATABASE MANAGEMENT AND ADMINISTRATION

(71) Applicant: Sprint Communications Company L.P., Overland Park, KS (US)

(72) Inventors: Joseph S. Pearson, Kansas City, MO (US); Dave E. Reimer, Shawnee, KS (US); John D. Schultz, Olathe, KS (US); Joshua J. Sternadel, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 784 days.

(21) Appl. No.: 14/956,267

(22) Filed: Dec. 1, 2015

(51) Int. Cl.
*G06F 16/23* (2019.01)
*G06F 16/955* (2019.01)
*G06F 16/11* (2019.01)

(52) U.S. Cl.
CPC ............ *G06F 16/23* (2019.01); *G06F 16/122* (2019.01); *G06F 16/955* (2019.01)

(58) Field of Classification Search
CPC .. G06F 17/505; G06F 17/5059; G06F 9/3869; G06F 17/148; G06F 16/23; G06F 16/122; G06F 16/955; G06F 16/2365; G06F 16/13; G06F 16/215; G06F 16/182; G06F 16/22; G06F 16/2291; G06F 16/285; G06F 16/93; G06F 16/2282
See application file for complete search history.

(56) References Cited

U.S. PATENT DOCUMENTS

| 2004/0230596 | A1* | 11/2004 | Veitch | G06F 11/2094 |
| 2005/0246382 | A1* | 11/2005 | Edwards | G06F 3/061 |
| 2007/0078872 | A1* | 4/2007 | Cohen | G06F 17/30696 |
| 2010/0114818 | A1* | 5/2010 | Lier | G06F 17/30286 707/613 |
| 2013/0262385 | A1* | 10/2013 | Kumarasamy | G06F 17/30581 707/634 |

OTHER PUBLICATIONS

Erhard Rahm, Hong Hai Do, Data Cleaning: Problems and Current Approaches, vol. 23 No. 4 (Year: 2000).*
John Wiley & Sons, Inc., Structured Query Language (SQL) Fundamentals, 9.2.1-9.2.29 (Year: 2003).*

* cited by examiner

*Primary Examiner* — James Trujillo
*Assistant Examiner* — Fatima P Mina

(57) ABSTRACT

Systems and methods discussed herein are associated with database maintenance and querying, in particular updating a database where entries in the database may be associated with an order indicated by at least one field associated with each entry. Entries added to the database may comprise ordering identifiers that are strings and that may comprise sub-strings, these ordering identifiers are automatically assigned by an application and when the database is queried, the data file returned comprises at least some of the entries ordered based upon the ordering identifiers.

19 Claims, 3 Drawing Sheets

SYSTEMS AND METHODS FOR DATABASE MANAGEMENT AND ADMINISTRATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Various data structures may store information regarding the functioning of enterprises in areas such as manufacturing, research & development, quality control, and regulatory assurance. These data structures may contain milestones, legal requirements, internal requirements, and other information regarding project or operational tasks that are performed in order to achieve an enterprise goal. These data structures may be modified and in some cases queried by enterprise employees or third parties in order to determine the milestones, legal requirements, internal requirements, or other tasks associated with projects or other enterprise or third party operations.

SUMMARY

In an embodiment, a system for database maintenance, comprising: a server comprising a non-transitory memory and in communication with a plurality of data stores comprising tables, wherein each table comprises at least some entries, wherein each entry comprises a plurality of fields, and wherein the plurality of fields comprises an entry order and an ordering identifier; an application stored in the non-transitory memory and executable by a processor to: receive a new entry to add to a table; and determine an ordering identifier for the new entry, wherein the ordering identifier is unique to the new entry and is associated with the order in which the new entry is to be performed with respect to at least some of the other entries. The embodiment further comprising wherein the application is configured to assign the ordering identifier to the new entry, wherein the ordering identifier is a string comprising at least two sub-strings and a delimiter; receive a request to generate a data file from the table comprising at least some of the entries of the plurality of entries, at least some fields of the plurality of fields associated with each entry, wherein the request comprises a field by which to order the at least some entries in the data file, and wherein the field comprises the ordering identifier; and generate a data file comprising the at least some entries, wherein the data file comprises the new entry displayed in an order with the other entries based upon the ordering identifier.

In an embodiment, a method for adding sequential entries to files while minimizing reprocessing, comprising: storing, by an application stored in a non-transitory memory of a server and executable by a processor, in a data store of a plurality of stores, a plurality of entries associated with requirements for a project, wherein each entry comprises a plurality of fields including an entry order and an ordering identifier, wherein a first entry is associated with a first ordering identifier and a second entry is immediately sequential to the first entry and is associated with a second ordering identifier, wherein the first identifier is different than the second identifier; and receiving, by the application, a request to add an entry to the data file, and wherein the entry associated with the request comprises an indication that the new entry order is in between the first entry and the second entry. The embodiment further comprising: determining, by the application, based upon the request, that the ordering identifier for the new entry comprises a combination of the first and the second identifiers; assigning, by the application, the ordering identifier to the new entry; and generating, by the application, a data file comprising at least some of the plurality of entries sorted by the ordering identifier, wherein the at least some of the plurality of entries comprises the new entry, the first entry, and the second entry, and wherein the new entry is between the first and the second entries in the data file.

An alternate method of method of database maintenance, comprising: storing, by an application stored in a non-transitory memory of a server and executable by a processor, in a data store of a plurality of stores, a data file comprising a plurality of entries, and wherein each entry comprises a plurality of fields including an ordering identifier, receiving, by the application, a request to add an entry to the data file, wherein the entry associated with the request comprises an indication that the new entry order is after a last existing entry in the data file, wherein the last existing entry is associated with an ordering identifier; and assigning, by the application, based upon the request, an ordering identifier for the new entry, wherein the ordering identifier assigned to the new entry comprises a plurality of sub-strings including at least part of the ordering identifier associated with the final existing entry. The embodiment further comprising: storing, by the application, in the data store, the new entry and the associated ordering identifier; and generating, by the application, a data file comprising at least some of the plurality of entries sorted by the ordering identifier, wherein the new entry is ordered sequentially immediately after the final existing entry in the data file.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts

DETAILED DESCRIPTION

Figure 1:
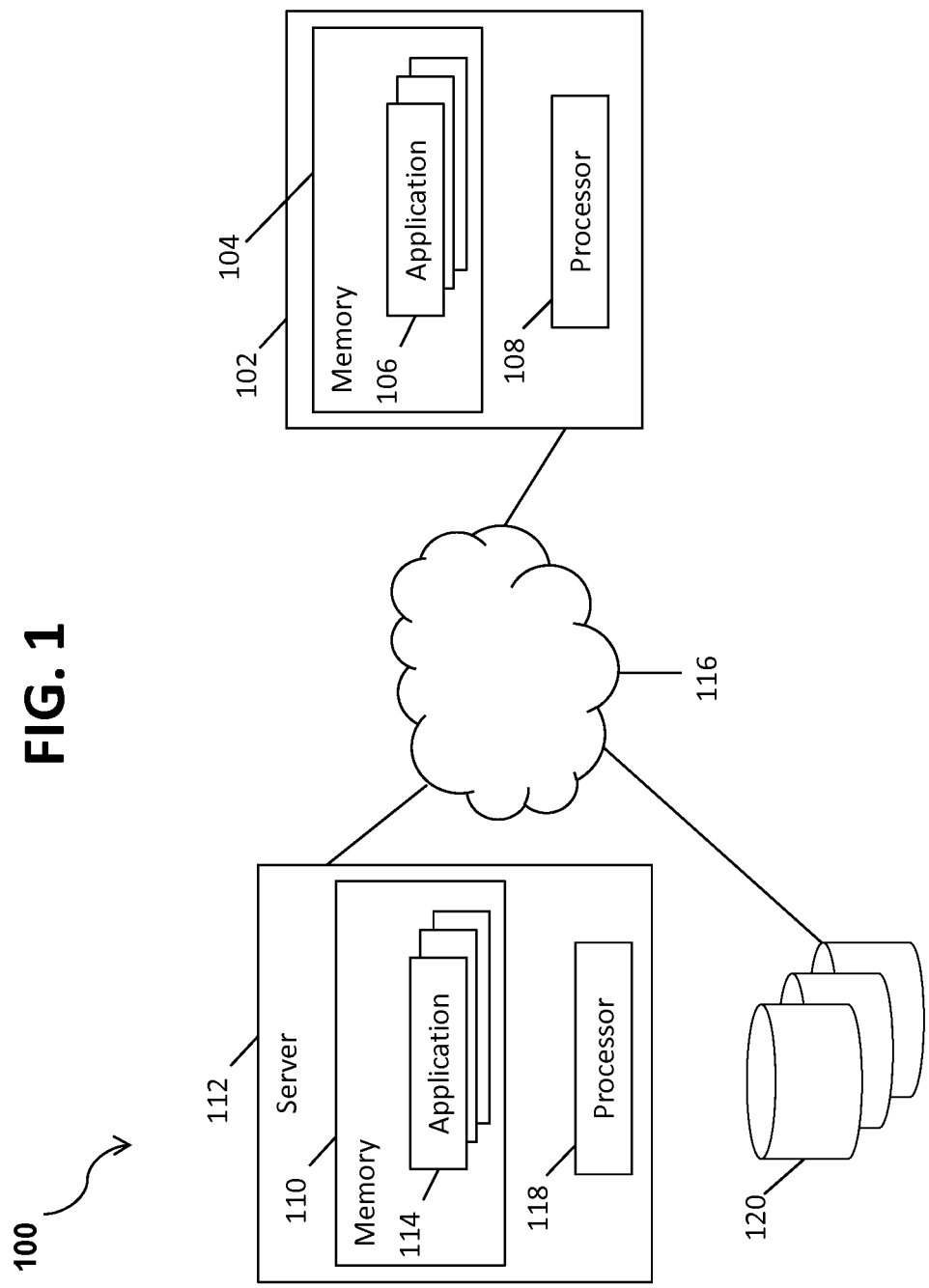
FIG. 1 is an illustration of a system for database maintenance according to certain embodiments of the present disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Large, complicated databases may be employed in enterprises for human resources, project management and planning, engineering, R&D, and other purposes. These databases can be large, comprising thousands, tens of thousands, or more entries, and each entry may comprise a plurality of fields, some or all of which may be populated upon the addition of the entry to the database, and some or all of which may be populated subsequently, for example, upon task completion or associated approvals. Databases and other tables and files may be designed for rapid search and return of large volumes of data and not designed with nor consistent with commands for inserting new data entries in a particular location of sequence.

In an embodiment, if some of the entries and/or the fields are linked to and/or related to each other, for example, because they are to be completed sequentially or concurrently, adding or deleting entries may cause some or all of the other entries to update at least some fields, for example, an "order" or other unique identifier field. In some embodiments, the database may be a requirements database that comprises a plurality of entries, each comprising a plurality of fields, including an ordering identifier as discussed herein which may identify a set of entries by an order of operation, duration, responsible party, or other field. This update may take time and money due to the sheer size of the database, and this may cause a delay in getting information to both internal and external parties. Using the systems and methods discussed herein, entries can be added to a database such as a requirements database without reordering (reassigning ordering identifiers and/or sorting by ordering identifier) the other entries in the database. When the entries are ultimately reordered, the ordering identifiers assigned when an entry is new may be reassigned, e.g., during the generation of a data file comprising a subset of the plurality of entries.

The external parties that may have a vested interest in the database and who may query or receive queried information in the form of a data file from the database may comprise vendors, contractors, subcontractors, or other parties that may be associated with the enterprise which may be a telecommunications service provider. Other fields associated with the entries may comprise test completion or test results, articulation of requirements, verification of testing, weighting of importance to the overall project, sub-requirements and links to sub-requirements in other tables. In one example, a field may indicate if a test is to be completed for a first requirement before a second sequential requirement is started in whole or in part. Database tools are used herein to capture requirements for enterprises such as a telecommunications service provider outside of a test case environment and in a production/project environment. The methods and systems discussed herein allow the requirements database to be coupled with other artifacts associated with software development such as test cases, but are not limited to tests cases and can instead be rolled out in other scenarios.

Using systems and methods discussed herein, entries may be added to an existing database such as a requirements database, taking into account that databases may not be designed for nor consistent with commands for inserting new data entries in a particular location and/or sequence. The systems and methods discussed herein enables the addition of entries to the table while minimizing significant the constant reprocessing that may result from resetting all of the other entries in a sequence when new entries are added. A "requirements database" may be the term used to describe a data file such as a table or a plurality of tables that comprises a plurality of entries that define desired functionalities of a product such as hardware or software, each entry comprising a plurality of fields. In an embodiment where a plurality of tables are employed, entries in some or all of the tables may be related by order of operations, overlapping stakeholders, or other aspects of the entries that link and/or otherwise associate the entries between tables. As the entries may be related and/or dependent on each other, and various fields may represent these dependencies. The requirements database may be queried by an enterprise and/or by third parties to generate a requirements list for example, for the design of software, hardware, or other products, where the requirements comprise operational and functional features of a product so that a vendor can determine the customer's requirements for the product, some of which may be associated with local, federal, or other regulatory requirements.

An "ordering identifier" may be the term used to describe which order an entry that may be associated with a requirement in a requirements database, and an "entry order" or "order of entry" or "requirement ID" may be the term or terms used to describe a field or an attribute of an entry that represents when the entry was made in the requirements database. This requirement ID may be used for change control, date tracking, or other purposes and may comprise, for example, an identification comprising "BR-1" which may identify a section because "BR" may indicate a browser requirement, and some or part of these requirement IDs may be employed to associate the requirements with areas of functionality such as browser function. There may be other fields and attributes associated with entries, including modification date, modification content, deletion date, and so on. Modification dates may include when fields associated with the entry were modified, added, or otherwise populated for the first time, regardless of whether the modification was to an ordering identifier or another field. The data stores discussed herein may be accessed directly or through a graphical user interface comprising a web entry form. Third parties including OEMs may be able to query the database and receive a data file generated based upon any field including the ordering identifier so that the OEM is able to determine the order in which various requirements are to be completed as well as the dependencies and sub-tasks/requirements associated with the project.

The requirements database may be configured to be queried and generate a requirements data file comprising an ordered list of tasks that may indicate the task, sub-tasks, linked tasks (dependencies including parent/child relationships), and the status of completion/scheduling for tasks and sub-tasks. This data file may be generated using all or part of the requirements in the database, and the requirements may be desired in an ordered format. An ordering identifier may be used for this purpose. The ordering identifier may comprise a field of at least one string that is associated with an order of operations for the requirements list. This ordering identifier may link or tie entries together, such entries may be performed in sequence, concurrently, or with an at least partial overlap. These requirements may be performance/operational functionality, manufacturing, inspection/quality, regulatory, or other requirements that are to be performed in an ordered fashion, so the data file may serve as a checklist or other auditing tool. Using conventional methods, if entries were added to this database, each existing entry would have to be renumbered, that is, at least some existing entries in a database would receive at least a new ordering identifier, in response to entries being added, and for large databases with thousands, tens of thousands, or more entries, this can be a costly and time-consuming process.

In contrast, using the systems and methods discussed herein, if entries are added to existing entries in a requirements database, this may be done without renumbering or reordering the existing entries, e.g., without assigning new ordering identifiers to existing entries when a new entry or entries are added, which saves time since the requirements database may comprise thousands of requirements (entries). The new entries may be assigned unique identifiers (ordering identifiers) associated with a product functionality or other operational characteristic these ordering identifiers may be employed in a query to generate a list or a partial list from the requirements database. In one example, an ordering identifier comprises a string, which may be a zero-padded string. The string is not an integer, but rather a sequence of characters that, in an embodiment, may be of a fixed length. Ordering identifiers may be referred to as strings and may comprise sub-strings, each of which may be separated from the next sub-string by at least one delimiter such as periods, spaces, commas, or other characters. It is appreciated that concatenation is discussed herein, and that integers cannot be concatenated.

The ordering identifiers discussed herein may comprise characters, letters, numbers, or combinations thereof in a string that comprises sub-strings separated by delimiters. As discussed herein, strings and sub-strings may be represented by numbers, letters, characters, and/or combinations thereof and it is to be appreciated that these are merely illustrative examples of possible strings and sub-strings used for description purposes and do not limit the types of strings and sub-strings employed in the embodiments discussed herein.

In an embodiment, a first ordering identifier comprises a "00001" value and a second entry comprising an identifier of "00002" when the requirements database is queried to be ordered according to the ordering identifiers, the first entry is displayed immediately before the second entry. If an entry is added to the requirements database that is to be performed in between the first and the second entries, and/or that is otherwise linked to the start or completion of the first and/or the second entries, instead of assigning "00002" to the new entry and renumbering the second entry as "00003" as well as every entry subsequent to the second entry, the new entry may be assigned a combination of sub-strings separated by a delimiter. In one example, the ordering identifier for the new entry comprises "00001.00002". When the requirements database is queried after the new entry is submitted, a data file may be generated that lists the first entry "00001", the new entry "00001.00002", and the second entry "00002", in that order. That is, the querying application recognizes that the new entry has an associated ordering identifier that positions it in order in between the first and the second entries when a query for an ordered data file comprising some or all of the entries in the database is requested. It is appreciated that the query discussed above is associated with the retrieval and presentation of at least some of the requirements in the requirements database.

In an alternate embodiment, a first entry may comprise an ordering identifier "00001.00002" and a second entry comprising an ordering identifier of "00002", a new entry intended to be ordered between the first entry and the second entry may be automatically assigned an ordering identifier by an application of "00001", "00002.00002", and an entry intended to be ordered between the new entry and the second entry automatically assigned an ordering identifier by the application of "00001", "00001.00002.00002".

In an alternate embodiment, a first entry may comprise an ordering identifier "00001" and a second entry of "00001.00002", a new entry intended to be ordered between the first entry and the second entry may be automatically assigned an ordering identifier by an application of "00001", "00001.00002", and an entry intended to be ordered between the new entry and the second entry automatically assigned an ordering identifier by the application of "00001", "00001.00001.00002". Conventional tools may not be configured to process strings such as the ordering identifier that may comprise sub-strings as discussed herein.

In an alternate embodiment, an entry may be added after an existing final entry in a requirements database. A "final entry" may be the term used to describe the last entry listed in a database, after which no additional entries are found. In one example, if the final entry comprises an ordering identifier of "00808" the ordering identifier of the new entry may comprise "00808.00809". While the addition of new entries is discussed herein, the methods and systems may also be employed to modify existing entries, e.g., to change an ordering identifier of an existing entry to re-order it between two different requirements than it is presently ordered between.

FIG. 1 is an illustration of a system 100 according to certain embodiments of the present disclosure. In the system 100, a server 112 is in communication with user equipment 102, which may comprise a personal computing device, laptop computer, mobile communication device, tablet, personal digital assistant, or other device capable of sending and receiving communications by way of a network 116 that the user equipment 102 and the server 112 may be in communication with via wireless and/or wired communication links. The server 112 may comprise a non-transitory memory 110 that may store all or part of at least one application 114, which may in some embodiments be described and implemented as a plurality of modules. A processor 118 may be capable or executing the application 114, and both the server 112 and the user equipment 102 may be in communication with a plurality of data stores 120 that is also in communication with the network 116. In an embodiment, at least one data store of the plurality of data stores 120 may comprise a record of assigned ordering identifiers in order to not duplicate assignments in the methods discussed herein. In some embodiments, even if a requirement is removed from one or more tables, the ordering identifier associated with that requirement may not be reused.

In an embodiment, the user equipment 102 may be configured to receive inputs to a requirements database stored in a data store of the plurality of data stores 120 from a user by way of the application 106 using the functionality of the user equipment's memory 104 and processor 108. These inputs may be new entries to the requirements database or modifications to existing entries. The requirements database may comprise a plurality of requirements for product builds, launches, equipment builds and maintenance, and other projects that may be defined by a plurality of steps or tasks that may each be defined by one or more entries in the requirements database. Each entry may comprise a plurality of fields that define the entry and by which the database may be searched, queried, ordered, and re-ordered. Entries may be added to or deleted from the database manually or automatically based upon an at least one field that may comprise an expiration or a completion field. Entries may also be modified by modifying data in one or more fields, adding new fields, or deleting information previously entered in fields. Entries may be added by way of an interface that presents an entry form where a user may enter information in some or all of a plurality of fields, some of which may be required fields depending upon the embodiment. In an embodiment, a user may enter information into fields in a form displayed by the application 106 to define the order of the new entry and send that information to the application 114 which may receive the new entry and, based on the information in the new entry, the application 114 may generate and assign an ordering identifier to the new entry as discussed herein. The new entry may comprise a field where the order of the new entry with respect to the existing entries can be specified. That is, if the new entry is intended to be ordered between existing entries 45 and 46, the new entry may comprise a "46" for the order, and the ordering identifier may be assigned based upon that input. For example, if entry 45 is associated with an ordering identifier of "00005.00006" and entry 46 is associated with an ordering identifier of "00005.00005.00006" the ordering identifier assigned to the new entry may comprise "00005", "00005.00005.00006"—4 sub-strings separated by delimiters and comprising the ordering identifier string. The difference between an "order" and an "ordering identifier" as discussed herein may be that entries comprising a sequential order of operations of 43, 44, 45, 46, and 47 may be performed according to that numerical order, but the entries associated with each of those operations may comprise ordering identifiers that are strings that may comprise sub-strings and that may or may not correspond to the order of operations associated with the entry.

In one example, initial inputs into a requirements database may comprise an order field and an ordering identifier that initially correspond, e.g., a first entry with an order field of 1 may be associated with an ordering identifier string of "00001" or "0000A" or "AAAAA" or other combinations that constitute a string, and a second sequential entry with an order field of 2 may be initially associated with an ordering identifier of "00002" or "0000B" or "AAAAB" or other combinations that constitute a string as discussed herein. When new entries are added and/or entries are deleted, the entries may be associated with ordering identifiers that do not correspond to the order field, regardless of whether the order field has changed from its initial value. An entry that is to occur in between the first and the second entries may be assigned an ordering identifier comprising two sub-strings separated by a delimiter, such as "00001.00002" or "0000A.0000B" or "AAAAA. AAAAB". When the requirements database is queried based upon a range of ordering identifiers or an upper or lower ordering identifier (max or min), the data file output comprises the first, new, and second entries in an order as determined by the ordering identifier associated with each entry.

In an alternate embodiment, the input may comprise a set of entries between which the new entry is to occur sequentially, so the new entry input would comprise a "45" and a "46." In another alternate embodiment, the order of the new entry may be based upon another entry field, such as a task name, description, category, function, or other field or combinations of fields, or may be inserted directly into the database in between individual requirements. Regardless of how the new entry input or modification to an existing entry is received, the method may proceed according to embodiments discussed below in FIG. 2.

In some embodiments, the requirements database may be normalized, which may involve concatenation. Normalization of the requirements database may comprise an automated process that occurs at predetermined intervals or at the end of a project phase. Normalization comprises automatically updating the requirements database to re-order the entries based, for example, on the ordering identifier. In some embodiments, this process may replace the previous ordering identifiers, so entries may comprise an ordering identifier with multiple sub-strings that are replaced with a single string ordering identifier during the normalization process. In one example, a first entry comprises an ordering identifier of "00005", "00005.00006", a second entry comprises an ordering identifier of "00005.00006", and a third entry comprises an ordering identifier of "00005", "00006.00006". Subsequent to normalization, the first entry may be associated with (assigned) an ordering identifier of "00005", the second entry may be associated with an ordering identifier "00006", and the third entry may be associated with an ordering identifier "00007". It is appreciated that these are illustrative examples with respect to the representation of the strings, and that the strings and sub-strings comprising the strings may comprise symbols, numbers, letters, or combinations thereof. As such, normalization associates the entries with a single-string ordering identifier even if the entries were previously associated with ordering identifiers comprising sub-strings.

Figure 2:
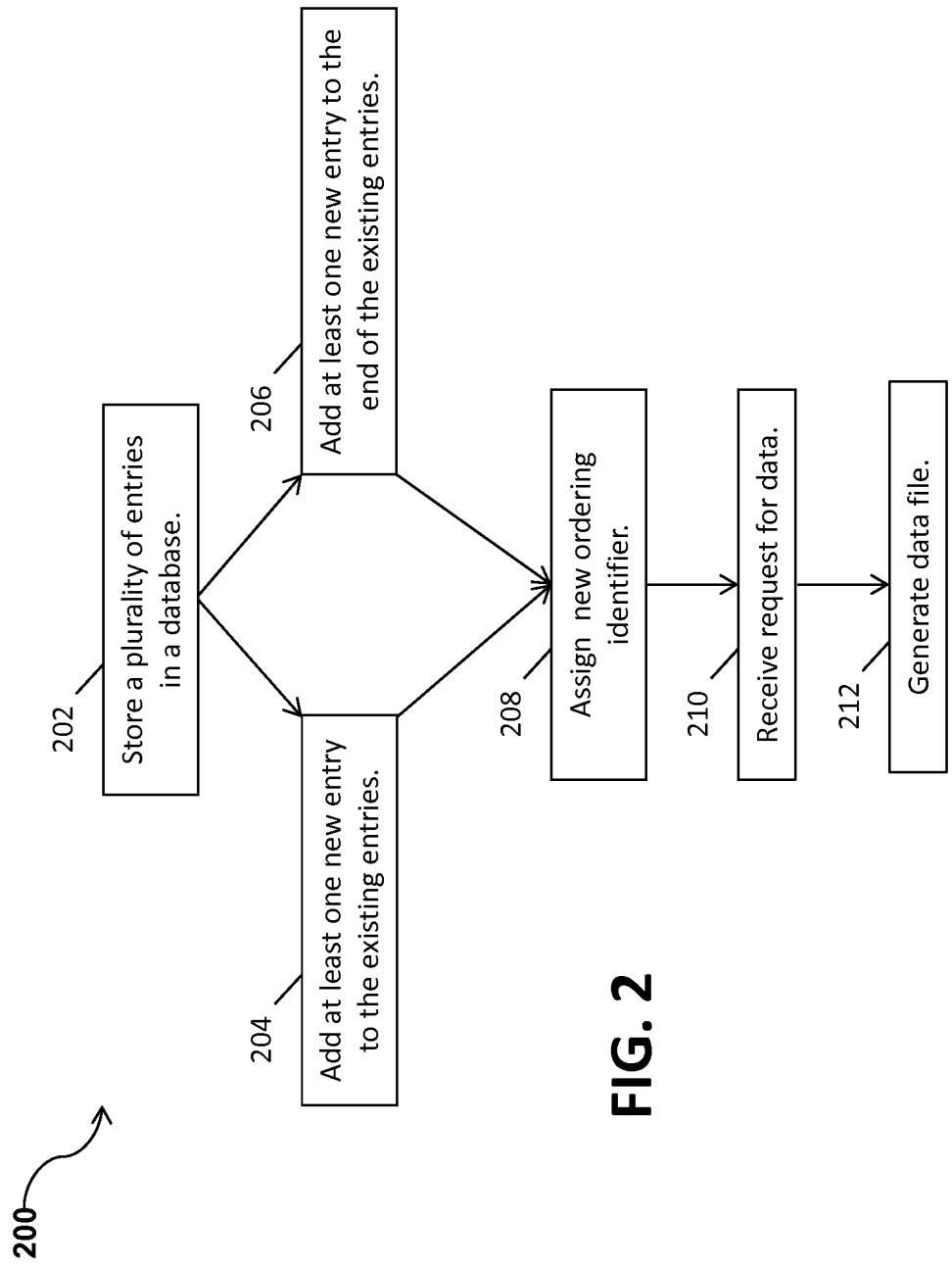
FIG. 2 is a flowchart that illustrates a method of updating and/or modifying a requirements database according to embodiments of the present disclosure.

FIG. 2 illustrates a method 200 of updating and/or modifying a requirements database according to embodiments of the present disclosure. In the method 200, at block 202, a plurality of entries is stored in a database that may be referred to as a requirements database. The requirements database may comprise a plurality of steps, or requirements, for product launches, development, manufacturing, or other projects that may comprise steps or tasks that are to be performed in a predetermined order. The initial entries in a database may each comprise a plurality of fields, some of which may be entered by a user and some of which may be generated automatically by the application 114. An enterprise employee, vendor, contractor, or other party may have access to an application such as the application 106 discussed in FIG. 1. The party, which may be an original equipment manufacturer (OEM), may use the application 106 query the requirements database, and in other embodiments queries may be directly submitted to an application such as the application 114. The application 114 may retrieve the requested information received from the user and/or from the application 106 from the requirements database and may generate a data file comprising a plurality of entries. The retrieved entries may be ordered based upon the information requested in the query. At block 204, at least one new entry may be added to the database. The new entry may be added at block 204 using a web interface and an entry form comprising fields associated with the new entry including the order of operations of the new entry as compared to the other entries, which may be defined by indicating the ordering identifier associated with at least one of the entry immediately before or immediately after the new entry. That is, a new entry may be received using a graphical interface that promotes entry of a plurality of fields including a field that indicates different entry by its ordering identifier which the new entry is to be placed immediately before or immediately after. In an embodiment when a new entry is received to be entered after the existing final entry, the existing final entry may be the sole reference point used in the entry form.

In an alternate embodiment, the new entry is received at block 204 by a direct entry into the requirements database, that is, by an "insert" function whereby the user can manually insert the entry to be ordered in between two sequentially ordered requirements, where the new entry is represented as occurring in order between the two previously sequentially ordered requirements when a data fie is output as discussed herein. It is appreciated that entries in a requirements database may be modified as discussed herein and so two initially adjacent and sequential (as defined by the ordering identifier associated with each entry) entries may no longer be adjacent in the database itself but may be sequentially ordered with respect to the ordering identifiers, depending upon how the database is modified. At block 208, the application 114 may assign an ordering identifier to the new entry based upon the information associated with that new entry as well as the ordering identifiers currently in use in the requirements database. That is, if the new entry is slated to be ordered between existing sequentially ordered entries (according to the ordering identifier) that each comprise one ordering identifier string (e.g., a first entry associated with an ordering identifier of "0000A" and a second associated with a string "0000B"), the new entry may be assigned an ordering identifier comprising two sub-strings and a delimiter (e.g., "0000A.0000B"). It is appreciated a string may comprise sub-strings, but in the event that an ordering identifier string comprises a single sub-string, it may simply be referred to as a string instead of a sub-string.

In another example, if the new entry is slated to be ordered between existing sequentially ordered entries (according to the ordering identifier) at least one of which comprises an ordering identifier of two substrings and a delimiter (e.g., a first entry associated with an ordering identifier of "0000A" and a second associated with "0000A. 0000B"), the new entry may be assigned an ordering identifier comprising three sub-strings and two delimiters (e.g., "0000A", "0000A.0000B"). It is appreciated that these are non-limiting examples employing variables to represent strings, and that letters, numbers, symbols, and combinations thereof may be employed for the strings and sub-strings. In some embodiments, zero-padding may be employed in the string generation and assignment so that concatenation done in response to requests such as those discussed below at block 210 can generate data files which properly reflect the order of operations (e.g., the order generated based on the ordering identifiers).

In an alternate embodiment, at block 206, that is, a user may manually input an entry after a final entry in a database either in the data store itself or using an entry form. If the new entry is intended to be the final entry in the database, that is, the last requirement to be performed in a sequential order of operations, it may still be assigned a series of sub-strings as an ordering identifier. In one example, if the final entry comprises an ordering identifier of "CCCDE" the ordering identifier of the new entry may comprise "CCCDE.CCCDF". The method 200 may then proceed along blocks 208, 210, and 212 as discussed above.

Concatenation is the term used to describe linkages between objects, that is, the process of taking two separate objects such as strings and positioning the two separate objects so that they are treated as one. In programming terminology, string concatenation describes the joining character strings from end to end, for example, so that two separate strings, e.g., "blow" and "torch" are read as "blowtorch." Concatenation may also be used in relational databases, for example, to display multiple fields of information as a single information piece. For example, if a database comprises a plurality of fields that define contact information, such as a street number, street name, city, state, and zip code, the information may be stored in the database as separate fields, but may be displayed using concatenation when a report is run on the information. If a single field comprises an entry of "235" and a street name entry of "Fern Street," a city entry of "Plantdale," a state entry of "FL," and a zip code of "33061," the entries may be concatenated when a report is run to display:

235 Lincoln Street
Parkview Fla.
33061

At block 210, the application 114 may receive a request for a data file comprising some or all of the plurality of entries from the requirements database. The request may comprise an at least one field which may comprise at least one data-entry field and in some cases additional data-entry fields wherein the requestor may specify a range of ordering identifiers and/or other fields on which the application 114 may base its retrieval of the at least some entries from the requirements database. The data file generated at block 212 in response to the request received at block 210 may be generated by a concatenation process that causes the at least some entries to be ordered according to the ordering identifier and/or an at least one other field in the data file that is output. In some embodiments, the data file may comprise hidden ordering identifiers which may have been concatenated to a more readable form, e.g., the ordering identifier field may comprise "0000A", "000AA.0000B" but a field corresponding to the order of operations may appear in the data file to be an integer reflecting the order of operations. That is, the entry associated with the ordering identifier "0000A", "000AA.0000B" may correspond to the nth order of operations, for example, step 37 is to be performed after step 36, and the end user would be presented with the "step" order that reflects the string and/or sub-strings associated with each entry, in the order of which those entries are to be performed.

Depending upon the embodiment, the ordering identifiers may comprise one or more strings, with each pair of adjacent sub-strings in an ordering identifier separated by a delimiter. The strings and sub-strings may comprise letters, numbers, symbols, zero-padding, and combinations thereof, and may be any length appropriate for the application. In some embodiments, an ordering identifier may comprise strings and substrings of varying lengths and types characters (letters, numbers, symbols, zero-padding, and combinations thereof) depending upon the size of the requirements database. In some embodiment, an ordering identifier string may comprise sub-strings of different and/or similar lengths and types of characters. While the strings and sub-strings may comprise varying lengths, the lengths are constant between sub-strings within a single string. For example, a valid identifier string may comprise "00001", "00001.00002", where the string length is 3 and the sub-string lengths are 5, 5, and 5. This is in contrast to an invalid identifier string which may comprise "00001", "00001.0000002" because the string length is 3 but the sub-string lengths are 5, 5, and 7, and are therefore not constant among and between each other within the string.

Figure 3:
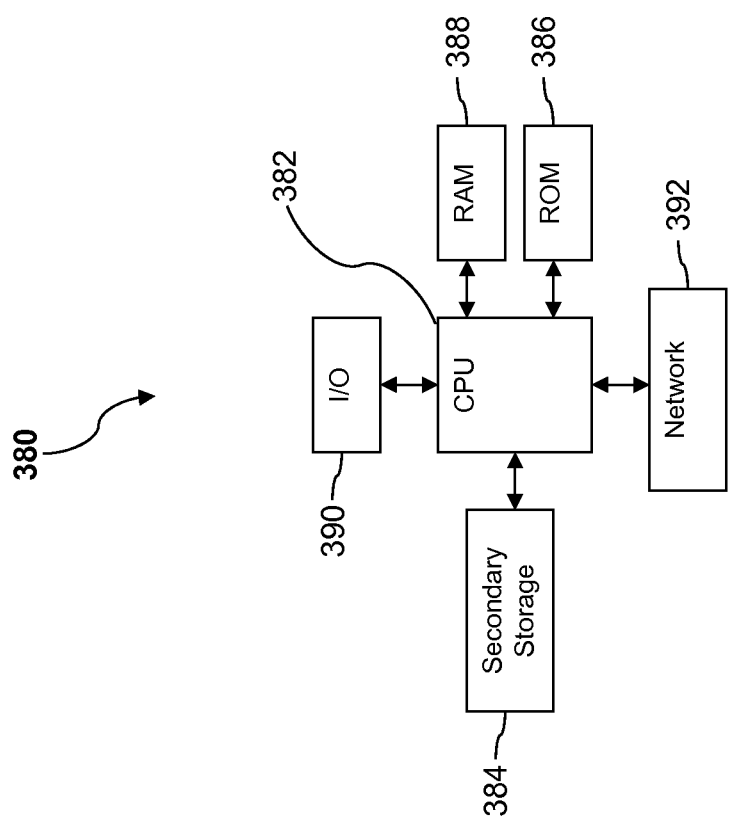
FIG. 3 is a block diagram which illustrates an exemplary computer system suitable for implementing one or more embodiments disclosed herein.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for adding sequential entries to files while minimizing reprocessing, comprising:
   a server comprising a non-transitory memory and in communication with a plurality of data stores comprising tables, wherein each table comprises at least some entries, wherein each entry comprises a plurality of fields, and wherein the plurality of fields comprises an entry order and an ordering identifier;
   an application stored in the non-transitory memory and executable by a processor to:
      receive a new entry to add to a table;
      determine an ordering identifier for the new entry, wherein the ordering identifier is unique to the new entry and is associated with the order in which the new entry is to be performed with respect to at least some of the other entries;
      assign the ordering identifier to the new entry, wherein the ordering identifier is a string comprising at least two sub-strings and a delimiter;
      insert the new entry into the table without changing ordering identifiers of the existing entries of the table and without reordering the table based on the ordering identifiers of the existing entries of the table;
      receive a request to generate a data file from the table comprising at least some of the entries of the plurality of entries, at least some fields of the plurality of fields associated with each entry, wherein the request comprises a field by which to order the at least some entries in the data file, and wherein the field comprises the ordering identifier; and
      generate a data file comprising the at least some entries, wherein the data file comprises the new entry displayed in an order with the other entries based upon the ordering identifier.

2. The system of claim 1, wherein the table comprises a record of assigned ordering identifiers and a record of unassigned ordering identifiers.

3. The system of claim 1, wherein the entry order is associated with a chronological order in which each entry of the plurality of entries is entered into the table.

4. The system of claim 1, wherein the entry is received from a computing device in communication with the server over a telecommunications network.

5. The system of claim 1, wherein the computing device comprises a desktop computer, a laptop computer, a mobile phone, a personal digital assistant, and a tablet computer.

6. A method for adding sequential entries to files while minimizing reprocessing, comprising:
- storing, by an application stored in a non-transitory memory of a server and executable by a processor, in a data store of a plurality of stores, a plurality of entries associated with requirements for a project, wherein each entry comprises a plurality of fields including an entry order and an ordering identifier, wherein a first entry is associated with a first ordering identifier and a second entry is immediately sequential to the first entry and is associated with a second ordering identifier, wherein the first identifier is different than the second identifier;
- receiving, by the application, a request to add a new entry to the data file, wherein the entry associated with the request comprises an indication that an order for the new entry is in between the first entry and the second entry;
- determining, by the application, based upon the request, that the ordering identifier for the new entry comprises a combination of the first and the second identifiers;
- assigning, by the application, the ordering identifier to the new entry;
- inserting the new entry into the data file without changing ordering identifiers of the existing entries of the data file and without reordering the data file based on the ordering identifiers of the existing entries of the data file; and
- generating, by the application, a data file comprising at least some of the plurality of entries sorted by the ordering identifier, wherein the at least some of the plurality of entries comprises the new entry, the first entry, and the second entry, and wherein the new entry is between the first and the second entries in the data file.

7. The method of claim 6, wherein each ordering identifier comprises at least 5 characters.

8. The method of claim 6, wherein each ordering identifier comprises an alphanumeric sequence.

9. The method of claim 6, wherein each ordering identifier comprises a sequence of letters and symbols.

10. The method of claim 6, wherein each ordering identifier comprises a sequence of letters, symbols, and numbers.

11. The method of claim 6, wherein at least some ordering identifiers comprise at least two sub-strings separated by a delimiter.

12. The method of claim 6, wherein at least some ordering identifiers comprise at least three sub-strings, wherein each sub-string is separated by a delimiter from the next string.

13. A method for adding sequential entries to files while minimizing reprocessing, comprising:
- storing, by an application stored in a non-transitory memory of a server and executable by a processor, in a data store of a plurality of stores, a data file comprising a plurality of entries, and wherein each entry comprises a plurality of fields including an ordering identifier;
- receiving, by the application, a request to add a new entry to the data file, wherein the entry associated with the request comprises an indication that an order for the new entry is after a last existing entry in the data file, wherein the last existing entry is associated with an ordering identifier;
- assigning, by the application, based upon the request, an ordering identifier for the new entry, wherein the ordering identifier assigned to the new entry comprises a plurality of sub-strings including at least part of the ordering identifier associated with the final existing entry;
- storing, by the application, in the data store, the new entry and the associated ordering identifier without changing ordering identifiers of the existing entries of the table and without reordering the table based on the ordering identifiers of the existing entries of the table; and
- generating, by the application, a data file comprising at least some of the plurality of entries sorted by the ordering identifier, wherein the new entry is ordered sequentially immediately after the final existing entry in the data file.

14. The method of claim 13, wherein each ordering identifier is a string comprising at least five characters.

15. The method of claim 13, wherein each ordering identifier comprises at least one of an alphanumeric sequence, a sequence of numbers and symbols, a sequence of letters and symbols, and a sequence of letters, symbols, and a sequence of numbers.

16. The method of claim 13, wherein at least some ordering identifiers comprise at least two sub-strings separated by a delimiter.

17. The method of claim 13, wherein at least some ordering identifiers comprise at least three sub-strings, wherein each sub-string is separated from the next sub-string by at least one delimiter.

18. The method of claim 13, further comprising receiving, by the application, a request to generate a partial requirements list, wherein the request comprises a request to retrieve a subset of entries of the plurality of entries within a predetermined range of ordering identifiers including the new entry, wherein the partial requirements list comprises the first entry, the new entry, and the second entry displayed in sequential order by the ordering identifier.

19. The method of claim 13, wherein the request is received from a computing device in communication with the server over a telecommunications network.

* * * * *